United States Patent
Ickinger

(10) Patent No.: US 7,064,464 B2
(45) Date of Patent: Jun. 20, 2006

(54) ELECTROMECHANICAL LINEAR DRIVE

(75) Inventor: Georg Ickinger, Graz (AT)

(73) Assignee: Demag Ergotech GmbH, Schwaig (DE)

( * ) Notice: Subject to any disclaimer, the term of this patent is extended or adjusted under 35 U.S.C. 154(b) by 285 days.

(21) Appl. No.: 10/768,330

(22) Filed: Jan. 30, 2004

(65) Prior Publication Data

US 2004/0222706 A1 Nov. 11, 2004

Related U.S. Application Data

(63) Continuation of application No. PCT/EP02/08361, filed on Jul. 26, 2002.

(30) Foreign Application Priority Data

Aug. 1, 2001 (AT) ........................................ A 1196/2001

(51) Int. Cl.
*H02K 7/06* (2006.01)

(52) U.S. Cl. ....................................................... 310/80
(58) Field of Classification Search ................... 310/20, 310/80
See application file for complete search history.

(56) References Cited

U.S. PATENT DOCUMENTS

| | | | | |
|---|---|---|---|---|
| 3,508,241 A | 4/1970 | Potter | ........................... | 340/682 |
| 4,811,992 A | 3/1989 | Steiner | ..................... | 301/105.1 |
| 5,210,653 A * | 5/1993 | Schell | ........................ | 359/846 |
| 5,289,042 A | 2/1994 | Lis | ............................... | 290/55 |
| 5,631,511 A | 5/1997 | Schulmann et al. | ........... | 310/83 |
| 5,862,686 A | 1/1999 | Skrippek | ....................... | 68/140 |
| 6,334,554 B1 * | 1/2002 | Bolyard et al. | ............. | 222/389 |

FOREIGN PATENT DOCUMENTS

| | | |
|---|---|---|
| DE | 32 13 172 | 10/1983 |
| DE | 39 15 526 | 8/1990 |
| DE | 39 41 444 | 6/1991 |
| DE | 196 52 929 | 6/1998 |
| DE | 199 07 589 | 10/2000 |
| EP | 0 478 499 | 4/1992 |
| EP | 0 723 848 | 4/1999 |

* cited by examiner

*Primary Examiner*—Darren Schuberg
*Assistant Examiner*—Judson H. Jones

(57) ABSTRACT

The invention relates to an electromechanical linear drive, in particular for an injection moulding machine, comprising an electric motor with a hollow-shaft rotor, open on one side, with a subsequent screw gear which converts the rotational movement of the hollow-shaft rotor into a linear movement. The hollow-shaft rotor is supported on the motor housing, at the end thereof closed by a end wall, such as to rotate, by means of a central bearing spigot projecting axially from the end wall. According to the invention, an extremely stable-running, exactly central and fail-safe rotor bearing may be achieved with a simple construction and in an economical manner, whereby the bearing spigot is supported on the motor housing such as to rotate by means of at least two axially pre-tensioned, counter-rotating, individual bearings, separated in the longitudinal direction and supporting longitudinal and transverse forces and, in the region of the open rotor end, an emergency running safety device for an eccentric rotor displacement is provided.

10 Claims, 2 Drawing Sheets

ELECTROMECHANICAL LINEAR DRIVE

PRIORITY CLAIM

This application claims priority under 35 U.S.C. §120 from PCT International Application No. PCT/EP02/08361, filed Jul. 26, 2002, and designating the United States.

BACKGROUND OF THE INVENTION

1. Field of the Invention

The invention concerns an electromechanical linear drive, especially for an injection molding machine, the drive having a motor housing containing a stator, a hollow cylindrical rotor received in the housing to form an electric motor having a magnet gap between the stator and the rotor, and a helical gear connected to the rotor for converting rotational movement of the rotor to linear movement.

2. Description of the Related Art

Electric motors for producing high torques, such as those described, for example, in DE 32 13 172 C2, as high-torque motors, have a hollow-shaft rotor of large diameter, which is usually open at one end and which, together with the stator, bounds a narrow magnet gap with a circumferential length that corresponds in size to the diameter of the rotor. A problem associated with motors of this type is how to support the hollow-shaft rotor so that it remains exactly centered, since even relatively small deflections of the rotor can cause it to contact the stator, which can lead to thermal or mechanical destruction of the motor. Accordingly, in the previously known hollow-shaft drive, the rotor is rotatably supported on the motor housing at the open end of the rotor by an external bearing that corresponds in size to the rotor diameter. This bearing must be realized as a precision bearing in light of the narrow width of the magnet gap. In another hollow-shaft motor, which is described in DE 39 15 526 A1, the rotor is rotatably supported at one end by a motor shaft of reduced diameter, which is attached to the closed end of the rotor, and by a roller bearing that holds this shaft, whereas, at the open end, the rotor is again supported by an external bearing that corresponds in size to the rotor diameter. This external bearing must also be designed as a precision bearing, which is complicated in design and therefore expensive.

SUMMARY OF THE INVENTION

The goal of the invention is to reduce the cost of building an electromechanical linear drive of the type specified above without compromising its mechanical operating reliability even under extreme loads.

In accordance with the invention, a bearing journal fixed to the rotor is rotatably supported in the motor housing by a pair of axially pretensioned bearings which are spaced apart axially and absorb axial and transverse forces acting in opposite directions. An anti-contact device located at the open end of the rotor prevents contact between the rotor and the housing in the event of eccentric deflection of the rotor with respect to the stator.

In accordance with the invention, due to the specific design and arrangement of the bearing, the hollow-shaft rotor is rotatably supported on the motor housing in an overhung manner so that it is free of play with almost no wobbling even under variable axial loads, there being no need for a complicated precision bearing at the open end of the rotor. In conjunction with the anti-contact system, it is also ensured that the rotor is prevented from contacting the stator even under extreme operating conditions. The drive is thus effectively protected from the damage or destruction that could occur as a result of slackness in the individual bearings caused by wear or as a result of excessive vibration.

In a further design simplification, the anti-contact system consists of an anti-contact bearing with radial slack, the slackness of the bearing being smaller than the magnet gap between the rotor and the stator of the electric motor, and/or of a contact sensor, which shuts off the electric motor in the event of a deflection of the open end of the rotor that is eccentric but less than the size of the magnet gap. Alternatively, a contactless fluid-dynamic or magnetic radial bearing may be provided in the area of the open end of the rotor as an anti-contact bearing. This bearing does not normally support any of the load; it operates instead only in an emergency and even then must support only the excessive dynamic rotor loads.

The same applies to another variant of the invention, in which the anti-contact system consists of at least three radial bearings, which are staggered around the circumference of the free end of the hollow-shaft rotor, and which radially support the rotor in case of an eccentric deflection. So that they can fulfill their anti-contact function, these bearings can be realized as slack roller bearings, e.g., ball bearings, of comparatively small dimensions, which are thus significantly less expensive than the precision bearings of large diameter and high load-bearing capacity that would otherwise be necessary.

The running stability of the hollow-shaft rotor can be improved even more by making the pretensioning force of the two individual bearings that hold the bearing journal greater than the maximum axial thrust of the linear drive.

Finally, in an embodiment of the invention especially preferred for design reasons, the gear element of the helical gear which is attached to the rotor is located inside the hollow-shaft rotor, which is especially advisable in view of the tight spaces available in an injection molding machine, where a spindle gear connected to the output side of the electric motor to drive the plasticating unit back and forth is housed inside the hollow-shaft rotor.

The invention is explained in greater detail below with reference to several embodiments of the invention illustrated in the highly schematic drawings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
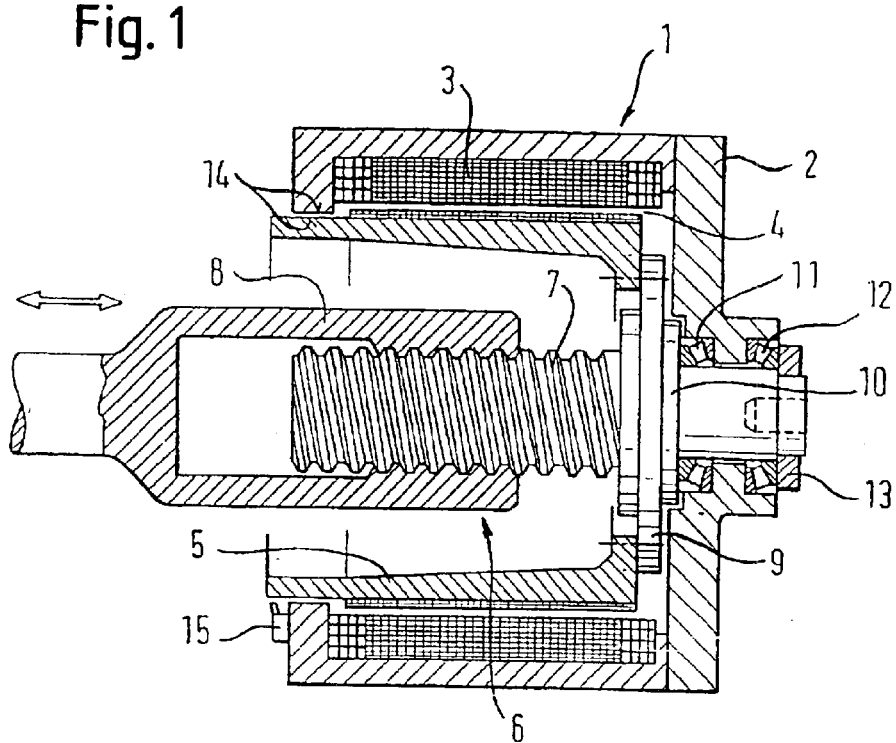
FIG. 1 shows a longitudinal section of a first embodiment of an electromechanical linear drive of the invention with an anti-contact bearing.

The electromechanical linear drive shown in FIG. 1 contains as its main components an electric rotary motor 1, which consists of a stator 3, mounted in the motor housing 2, and a large-diameter hollow-shaft rotor 5, magnetically coupled to the stator across a narrow air gap 4. The motor drives a spindle gear, designated overall by the reference number 6, which is housed inside the hollow-shaft rotor 5 and consists of a spindle shaft 7, which is connected nonrotatably to the rotor 5, with which it is coaxial, and a sleeve-like spindle nut 8, which is helically threaded to engage with the spindle shaft 7. The spindle nut, which is prevented from rotating, thus converts the rotational movement of the spindle shaft 7 into axial movement and thus controls the reciprocating motion of the plasticizing screw (not shown) of an injection molding machine.

At its end closed by the end wall 9, the hollow-shaft rotor 5 is provided with a bearing journal 10 of reduced diameter, which projects axially outward and thus rotatably supports the rotor in the motor housing 2 in an overhung manner with the help of two journal bearings 11 and 12, spaced a certain distance apart in the longitudinal direction of the journal. The two bearings 11, 12 are designed as roller bearings which absorb both longitudinal and transverse forces, but which act in opposite axial directions; they can be designed as cone bearings or as spherical roller bearings, and they are pretensioned against each other by a tension ring 13 in such a way that the pretensioning force is greater than the maximum axial thrust which can be exerted by the spindle nut 8. The bearing arrangement 11, 12 described above keeps the rotor running in an almost perfectly centered manner even under variable axial loads.

However, due to unforeseeable problems and/or elastic deflections of the overhung hollow-shaft rotor 5, the rotor may start to run eccentrically. For example, vibrations may develop at the free end of the rotor; if they should exceed the size of the magnet gap, they could damage or destroy the electric motor drive. To prevent this, an anti-contact system is provided at the free end of the rotor. As shown in FIG. 1, this system consists of an anti-contact bearing 14 in the form of a pair of contact surfaces with a certain amount of clearance between them, one surface being on the motor housing 2, the other on the end of the rotor. The clearance is smaller than the magnet gap 4. This ensures that the rotor 5 cannot strike the stator 3 when a critical deflection occurs in the area of the magnetic pole arrangements. To monitor the system for problems, an electric control circuit (not shown) may also be provided, which responds to mechanical contact between the anti-contact surfaces 14 or, with the aid of a thermal circuit breaker, responds to the frictional heating of the anti-contact bearing 14 and shuts off the electric motor 1.

In a variant of the emergency running safety device in accordance with FIG. 1, a contact sensor 15 is mounted on the motor housing 2 in the vicinity of the free end of the rotor at a certain distance from the outer circumference of the rotor 5 in such a way that this distance is smaller than the magnet gap 4. The contact sensor 15 again responds to a critical deflection of the rotor by switching off the electric motor 1.

Figure 2:
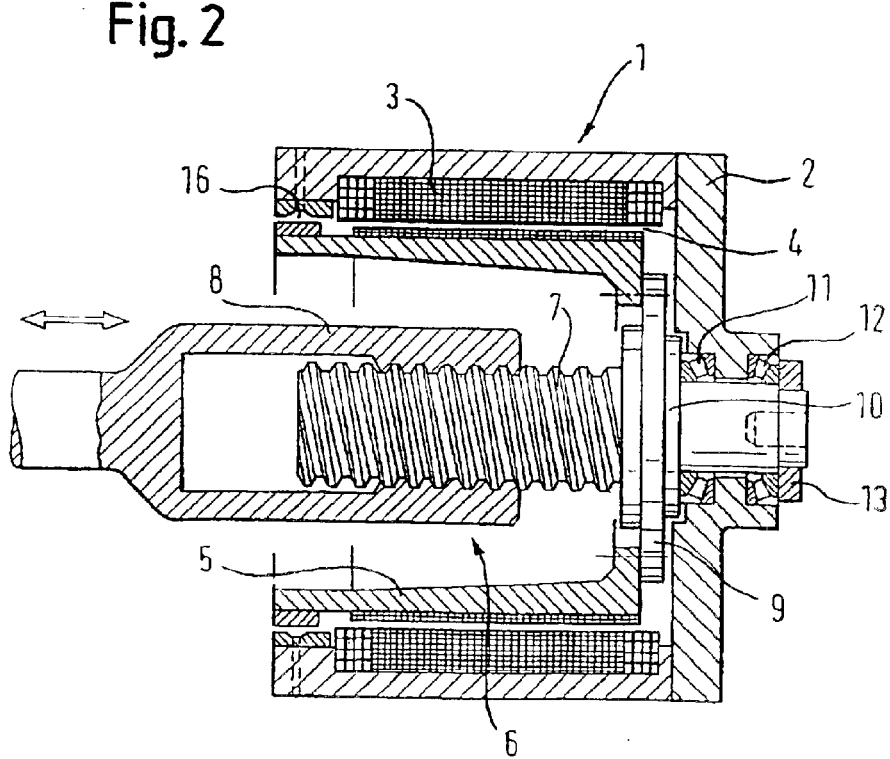
FIG. 2 shows another embodiment with an aerodynamic radial bearing as the anti-contact device in a view similar to that of FIG. 1.
Figure 3:
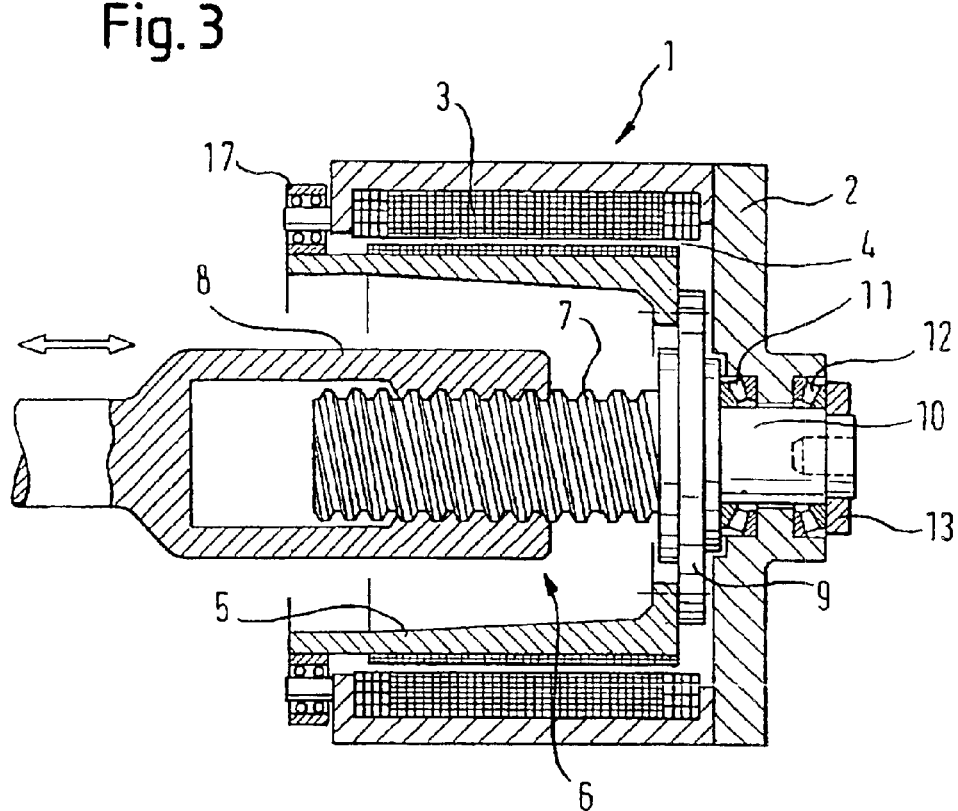
FIG. 3 show a longitudinal section view of another embodiment with an anti-contact device in the form of three small bearings staggered around the circumference of the open end of the rotor.
Figure 4:
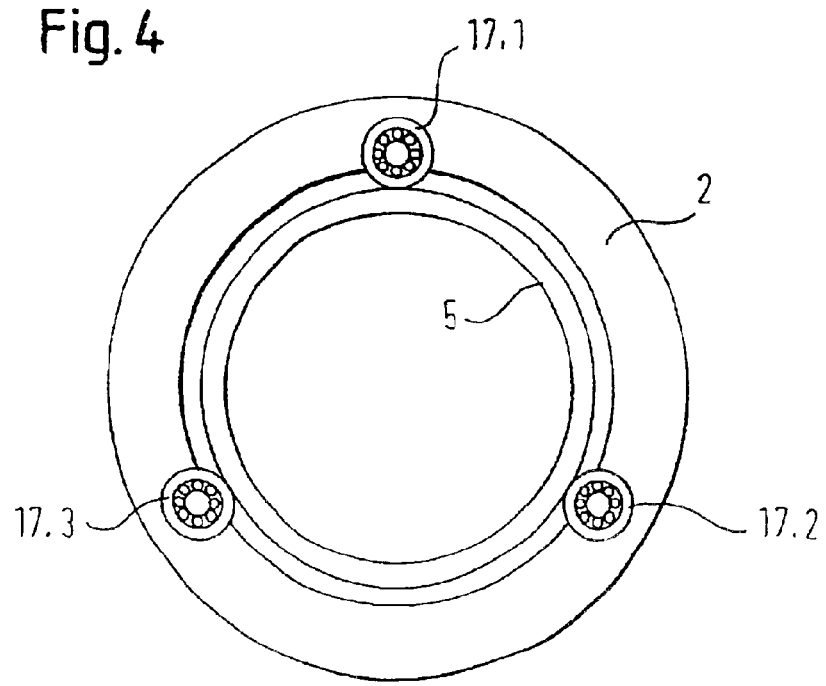
FIG. 4 shows a plan view of the rotor, stator, and bearings of FIG. 3.

FIGS. 2–4 show additional embodiments of an anti-contact device. FIG. 2 shows a fluid-dynamic, preferably aerodynamic, anti-contact bearing 16 placed between the motor housing 2 and the end of the rotor, and FIGS. 3 and 4 show an anti-contact device in the form of three slack ball bearings 17.1 to 17.3 of comparatively small diameter, which are uniformly distributed around the circumference of the rotor 5. As previously mentioned, the anti-contact bearings 16, 17 do not absorb any load during the normal operation of the rotor; they become active only in the event of a critical deflection of the rotor, and even then they are required to support only the dynamic deflection forces.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Electromechanical linear drive for an injection molding machine, the drive comprising:
    a motor housing containing a stator;
    a hollow cylindrical rotor received concentrically in the stator to form an electric motor having a magnet gap between the rotor and the stator, the rotor having an open end, a closed end, and a central bearing journal extending axially outward from the closed end;
    a helical gear connected to the rotor for converting rotational movement of the rotor to linear movement;
    two axially pretensioned individual bearings supporting the journal for rotation in the housing, the two bearings being spaced apart axially and absorbing both longitudinal and transverse forces in opposite directions, the two bearings providing the sole support for the rotor with respect to the stator when the rotor is concentric to the stator; and
    an anti-contact device located at open end of the rotor for preventing contact between the rotor and the stator in the event of eccentric deflection of the rotor with respect to the stator.

2. An electromechanical linear drive as in claim 1 wherein the anti-contact device comprises an anti-contact bearing having a radial clearance between the open end of the rotor and the motor housing, the radial clearance being less than the magnet gap.

3. An electromechanical linear drive as in claim 1 wherein the anti-contact device comprises one of a fluid dynamic radial bearing and a magnetic radial bearing mounted at the open end of the rotor.

4. An electromechanical linear drive as in claim 1 wherein the anti-contact device comprises a sensor which senses eccentric deflection of the rotor with respect to the stator and shuts off the motor when the deflection exceeds a predetermined deflection.

5. An electromechanical linear drive as in claim 4 wherein the sensor is a contact sensor mounted on the motor housing adjacent to the open end of the rotor at a distance from the rotor which is smaller than the magnet gap.

6. An electromechanical linear drive as in claim 1 wherein the anti-contact device comprises at least three radial bearings which are uniformly distributed about the open end of the rotor and support the rotor radially with respect to the stator in the event of eccentric deflection of the rotor with respect to the stator.

7. An electromechanical linear drive as in claim 1 wherein the helical gear generates a maximum axial thrust, the individual bearings being adjusted to have a pretensioning force which is greater than the maximum axial thrust.

8. An electromechanical linear drive as in claim 1 wherein the helical gear is fixed concentrically in the cylindrical rotor and extends toward the open end.

9. An electromechanical linear drive as in claim 8 wherein the helical gear consists of a spindle gear arranged to drive a plasticizing unit of an injection molding machine back and forth.

10. An electromechanical linear drive as in claim 1 wherein said axially pretensioned bearings are conical bearings which provide both radial and axial support for the journal with respect to the housing.

* * * * *